US012668227B2

(12) United States Patent

Jin et al.

(10) Patent No.: US 12,668,227 B2

(45) Date of Patent: Jun. 30, 2026

(54) EQUIPMENT, SYSTEM, METHOD AND COMPUTER-READABLE STORAGE MEDIUM FOR FILLING AND BLEEDING BRAKE FLUID

(71) Applicant: Volvo Car Corporation, Gothenburg (SE)

(72) Inventors: Yongxing Jin, Shanghai (CN); Jiangliu Su, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 550 days.

(21) Appl. No.: 18/230,201

(22) Filed: Aug. 4, 2023

(65) Prior Publication Data

US 2024/0042986 A1     Feb. 8, 2024

(30) Foreign Application Priority Data

Aug. 8, 2022     (CN) .......................... 202210944978.8

(51) Int. Cl.
*B60T 17/22*          (2006.01)
*B60T 8/34*           (2006.01)
(Continued)

(52) U.S. Cl.
CPC .............. *B60T 17/222* (2013.01); *B60T 8/34* (2013.01); *B60T 17/04* (2013.01); *B67D 7/02* (2013.01);
(Continued)

(58) Field of Classification Search
CPC .......... B60T 17/222; B60T 17/04; B60T 8/34; B67D 7/02; B67D 7/06; B67D 7/36; B67D 7/62; B67D 7/78
(Continued)

(56) References Cited

U.S. PATENT DOCUMENTS 2,194,753 A * 3/1940 Inman ................... B60T 17/222
                                                  208/126
2,502,050 A * 3/1950 Kattner ................. B60T 17/222
                                                  188/352

(Continued)

FOREIGN PATENT DOCUMENTS

CA          2260628 A1    8/1999
CN         103043050 A    4/2013
(Continued)

OTHER PUBLICATIONS

First Office Action cited in corresponding Chinese Application No. 202210944978.8.

(Continued)

*Primary Examiner* — Minh Q Le
(74) *Attorney, Agent, or Firm* — Clements Bernard Walker; Christopher L. Bernard

(57)               ABSTRACT

Equipment, a system, a method and a computer-readable storage medium for filling and bleeding brake fluid. The equipment includes: a hydraulic pump, configured to supply brake fluid to a brake fluid reservoir of a vehicle; a command sending unit, configured to send a command to a hydraulic brake system of the vehicle for pumping the brake fluid to a bleed screw provided on a brake fluid loop; and a wireless transmitter, configured to send a wireless control signal to an exhaust device connected to the bleed screw for actuating tightening or loosening of the bleed screw. According to the present disclosure, the task of filling and bleeding brake fluid can be simply and efficiently completed for the vehicle, the labor cost and time cost can be effectively saved, and meanwhile, the task flow can be standardized and operation-friendly.

20 Claims, 7 Drawing Sheets

(51) Int. Cl.

| | |
|---|---|
| *B60T 17/04* | (2006.01) |
| *B67D 7/02* | (2010.01) |
| *B67D 7/06* | (2010.01) |
| *B67D 7/36* | (2010.01) |
| *B67D 7/62* | (2010.01) |
| *B67D 7/78* | (2010.01) |

(52) U.S. Cl.
CPC .................. *B67D 7/06* (2013.01); *B67D 7/36* (2013.01); *B67D 7/62* (2013.01); *B67D 7/78* (2013.01)

(58) Field of Classification Search
USPC ...................................... 137/565.17; 188/352
See application file for complete search history.

(56) References Cited

U.S. PATENT DOCUMENTS

| | | | | |
|---|---|---|---|---|
| 2,771,093 | A * | 11/1956 | Wilson .................. | F15B 21/044 137/543.17 |
| 3,339,401 | A * | 9/1967 | Peters .................... | B60T 17/222 73/40.5 R |
| 3,425,750 | A * | 2/1969 | Deane ................... | B60T 17/222 60/591 |
| 4,479,511 | A * | 10/1984 | Holland .................. | B60T 11/30 137/614 |
| 5,299,668 | A | 4/1994 | Youngers et al. | |
| 5,813,225 | A * | 9/1998 | Petty .................... | B60T 17/222 60/327 |
| 5,816,281 | A * | 10/1998 | Mixon .................. | B60T 17/222 188/352 |
| 5,967,199 | A * | 10/1999 | Riddiford ............. | B60T 17/222 188/352 |
| 7,575,029 | B2 * | 8/2009 | Robinson .............. | F15B 21/044 141/351 |
| 10,457,265 | B2 * | 10/2019 | Kapanowski ......... | B60T 17/222 |
| 2006/0138861 | A1 * | 6/2006 | Buschmann .......... | B60T 8/4081 303/122.08 |
| 2006/0192426 | A1 * | 8/2006 | Baechle ................ | B60T 17/222 303/119.1 |
| 2007/0175539 | A1 * | 8/2007 | Flournoy .............. | B60T 17/222 141/98 |
| 2009/0032347 | A1 | 2/2009 | Murphy et al. | |
| 2013/0160864 | A1 * | 6/2013 | Buchanan ............. | B60T 17/222 137/565.17 |
| 2013/0256071 | A1 * | 10/2013 | Jones ........................ | B60T 8/34 188/352 |
| 2013/0284015 | A1 | 10/2013 | Menten | |
| 2017/0011561 | A1 * | 1/2017 | Makke .................. | B60T 17/221 |
| 2019/0195250 | A1 | 6/2019 | Schaber | |
| 2022/0105921 | A1 * | 4/2022 | Tutor ..................... | B25B 13/06 |
| 2023/0029398 | A1 * | 1/2023 | Reinke .................. | B60T 13/662 |
| 2023/0134290 | A1 * | 5/2023 | Seol ........................ | B60T 7/042 303/5 |
| 2023/0286488 | A1 * | 9/2023 | Kim ...................... | B60T 17/222 |

FOREIGN PATENT DOCUMENTS

| | | |
|---|---|---|
| CN | 218858372 U | 4/2023 |
| EP | 1539554 A1 | 6/2005 |
| JP | 2007186140 A | 7/2007 |

OTHER PUBLICATIONS

Oct. 26, 2023 European Search Report issued in corresponding EP Application No. 23189533.

* cited by examiner

EQUIPMENT, SYSTEM, METHOD AND COMPUTER-READABLE STORAGE MEDIUM FOR FILLING AND BLEEDING BRAKE FLUID

CROSS-REFERENCE TO RELATED APPLICATION

The present disclosure claims the benefit of priority of co-pending Chinese Patent Application No. 2022 10944978.8, filed on Aug. 8, 2022, and entitled "EQUIPMENT, SYSTEM, METHOD AND COMPUTER-READABLE STORAGE MEDIUM FOR FILLING AND BLEEDING BRAKE FLUID," the contents of which are incorporated in full by reference herein.

TECHNICAL FIELD

The present disclosure relates to the technical field of vehicles, and more particularly, to equipment, a system, a method and a computer-readable storage medium for filling and bleeding brake fluid.

BACKGROUND

A vehicle brake system is an important constituent part of a vehicle, and its performance directly determines the safety and comfort of the vehicle during driving. In a common hydraulic brake system, brake fluid is used as the liquid medium for transferring brake pressure, to transfer the pressure to each brake wheel cylinder, thereby producing friction to implement vehicle braking.

When the vehicle is filled with brake fluid for the first time in the factory, the existing method is mainly to inject brake fluid into a brake fluid reservoir of the vehicle, so that the brake fluid eventually reaches the brake wheel cylinders through a brake fluid loop. However, since the service life of the brake fluid is limited, it is further required to replace the fluid regularly to ensure the driving safety of the vehicle, or it may be required to bleed brake fluid for other maintenance or testing purposes, so there is a need to bleed old brake fluid and fill new brake fluid.

In addition, it is further required to perform an air exhausting operation during the filling and bleeding of brake fluid. Once there is air in the enclosed loop system of the brake system, when braking, the air in the loop will be compressed first and then the brake fluid can be driven to move, which will result in a loss of stroke of the brake pedal, thereby increasing the braking response time and reducing the output of braking force, resulting in severe safety hazards.

Therefore, there is a need for a technique that can simply and efficiently fill and bleed brake fluid.

SUMMARY

According to one aspect of the present disclosure, there is provided equipment for filling and bleeding brake fluid, including: a hydraulic pump, configured to supply brake fluid to a brake fluid reservoir of a vehicle; a command sending unit, configured to send a command to a hydraulic brake system of the vehicle for pumping the brake fluid to a bleed screw provided on a brake fluid loop; and a wireless transmitter, configured to send a wireless control signal to an exhaust device connected to the bleed screw for actuating tightening or loosening of the bleed screw.

According to another aspect of the present disclosure, there is provided a system for filling and bleeding brake fluid, including: a brake fluid fill and bleed machine and an exhaust device. The brake fluid fill and bleed machine includes: a hydraulic pump, configured to supply brake fluid to a brake fluid reservoir of a vehicle; a command sending unit, configured to send a command to a hydraulic brake system of the vehicle for pumping the brake fluid to a bleed screw provided on a brake fluid loop; and a wireless transmitter, configured to send a wireless control signal to an exhaust device connected to the bleed screw for actuating tightening or loosening of the bleed screw. The exhaust device is connected to the bleed screw, and includes: a wireless receiver, configured to receive the wireless control signal; and an actuator, configured to transfer a rotation torque to the bleed screw according to the wireless control signal for actuating tightening or loosening of the bleed screw.

According to yet another aspect of the present disclosure, there is provided a method for filling and bleeding brake fluid, including: supplying brake fluid to a brake fluid reservoir of a vehicle; sending a command to a hydraulic brake system of the vehicle for pumping the brake fluid to a bleed screw provided on a brake fluid loop; and sending a wireless control signal to an exhaust device connected to the bleed screw for actuating tightening or loosening of the bleed screw.

According to still another aspect of the present disclosure, there is provided a non-transitory computer-readable storage medium storing instructions that cause a processor to perform a method for filling and bleeding brake fluid, including: supplying brake fluid to a brake fluid reservoir of a vehicle, sending a command to a hydraulic brake system of the vehicle for pumping the brake fluid to a bleed screw provided on a brake fluid loop; and sending a wireless control signal to an exhaust device connected to the bleed screw for actuating tightening or loosening of the bleed screw.

According to the techniques for filling and bleeding brake fluid of the present disclosure, the task of filling and bleeding brake fluid can be simply and efficiently completed for the vehicle, the labor cost and time cost can be effectively saved, and meanwhile, the task flow can be standardized and operation-friendly.

BRIEF DESCRIPTION OF THE DRAWINGS

These and/or other aspects and advantages of the present disclosure will become clearer and easier to be understood from the following detailed description of the embodiment of the present disclosure, taken in conjunction with the accompanying drawings, in which.

DETAILED DESCRIPTION

In order to make the skilled in the art better understand the present disclosure, the present disclosure will be further illustrated in detail below, taken in conjunction with the accompanying drawings and specific implementations.

Firstly, the operations involved in the existing process of filling and bleeding brake fluid are briefly described. A vehicle brake system is an important constituent part of the vehicle, which typically includes an enclosed brake fluid loop, in which basically incompressible brake fluid are moving. To this regard, a corresponding bleed screw is provided in an appropriate position in the enclosed brake loop according to the actual test situation. After the brake pedal has been pressed for many times, the air in the loop will gradually flow and aggregate at the position where the bleed screw is provided. At this time, the bleed screw may be loosened in order to release the gas mixed with the brake fluid. In the actual operating process, many operators are required to cooperate with each other to complete a significant number of operations in a strict order, which poses great challenges in terms of time consumption, physical strength exertion, brake fluid replacement efficiency, failure rate etc., and which has always been a key concern in the field of vehicle after-sales service.

As mentioned above, in order to replace the brake fluid and exhaust the air, a corresponding bleed screw is typically provided at an appropriate position in the enclosed brake loop (such as a position in the vicinity of the brake caliper). The bleed screw is typically a hollow bolt or valve stem, which is connected with the brake fluid loop and has a ventilation cavity. There are a steel ball and a spring provided at one end of the ventilation cavity. The top of the steel ball is pressed against the spring and the oil cavity port or ventilation cavity port. When the bleed screw is unscrewed, the steel ball is pushed away by positive pressure filling in the oil pipeline, so as to synchronously exhaust the air. After the brake pedal is pressed for many times, the air in the loop will gradually flow and aggregate at the position where the bleed screw is provided. At this time, the bleed screw may be loosened for exhausting the air.

There are brake calipers generally provided at four wheels of the vehicle, and four bleed screws are provided accordingly. However, the positions of the four bleed screws are not exactly the same. For example, the two bleed screws of the front wheels are typically at outer positions, while the two bleed screws of the rear wheels are typically at inner positions, so locating and aligning are required to be performed according to the positions of the bleed screws of different wheels, which is cumbersome to operate, limited in operating space, and difficult to tighten and loosen repeatedly by labor.

Figure 1:
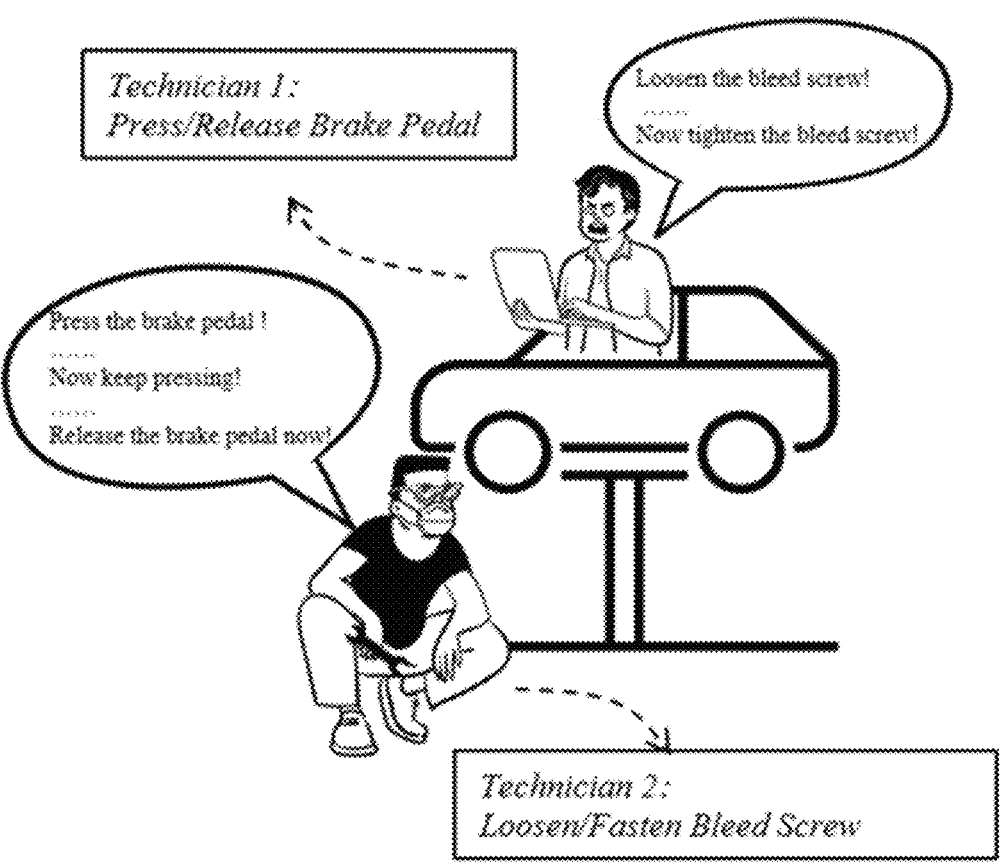
FIG. 1 shows a schematic diagram of a process of filling and bleeding brake fluid in a purely manual manner in an existing method.

As discussed above, in the process of filling and bleeding brake fluid in the prior art, a plurality of operators are required to cooperate with each other to complete a significant number of operations in a strict order, such as supplying of new brake fluid, actuating of brake pedal, screwing of bleed screw, and so on. FIG. 1 shows a schematic diagram of a process of filling and bleeding brake fluid in a purely manual manner in an existing method, in which one operator intermittently presses the brake pedal in the cab, so that the brake fluid is pushed to the brake fluid loop and thus reaches the vicinity of the bleed screw, and at the same time, another operator duly tightens or loosens the bleed screw to exhaust the air in the brake fluid loop utilizing the flow of the brake fluid.

As shown in FIG. 1, in the existing method of filling and bleeding brake fluid, at least two operators are required to cooperate tacitly and perform the operations described above in a certain order: one of the operators needs to repeatedly press/release the brake pedal in the cab, and utilize the hydraulic pump to pressurize the brake fluid so as to transport it through the brake fluid loop of the brake system to the vicinity of the bleed screw provided on the brake fluid loop, another one of the operators needs to use a wrench to duly tighten/loosen the bleed screw in the vicinity of the brake caliper at the wheel, so that the air in the brake fluid loop can be removed by means of the flow of the brake fluid, and at the same time, new brake fluid should be constantly supplemented so as to avoid a lack of liquid in the brake fluid reservoir. It can be seen that in the existing method of filling and bleeding brake fluid, two operators are required to complete operations such as pressing/releasing the brake pedal and tightening/loosening the bleed screw, which result in a great consumption of labor cost, time cost and physical strength cost, as well as inefficiency in filling and bleeding brake fluid. In addition, once two operators fail to apply the strength, timing, etc., in pressing/releasing the brake pedal and tightening/loosening the bleed screw accurately, or an error occurs in the cooperation among various operations, consequences such as incomplete bleeding of old brake fluid or incomplete exhausting of air may occur, which may further lead to a need of rework process or even lead to occurrence of safety accidents. Since the air remaining in the brake fluid loop of the brake system will adversely affect the brake system of the vehicle and its driving safety, the vehicle after-sales center needs to spend a lot of time and labor to ensure the completing quality of the process of filling and bleeding brake fluid, and needs to conduct plenty of trainings for the operators. Therefore, how to fill and bleed brake fluid simply and efficiently is an urgent problem to be solved by the vehicle after-sales service providers.

In view of this, the present disclosure proposes a novel automated technique of filling and bleeding brake fluid, in which by means of a linkage design of hardware and software, aspects such as supplying of supplementary brake fluid, pumping of the brake fluid within the brake fluid loop, screwing of the bleed screw, and the like are integrated together, which makes the process of filling and bleeding brake fluid easier and more convenient and avoids the inconvenience in operation.

Next, the basic idea of the technique of filling and bleeding brake fluid proposed in the present disclosure is briefly summarized. On the one hand, in the vehicle's hydraulic brake system, sources of brake hydraulic power not only include the driver's pressing on the brake pedal, but also include the electronic hydraulic pump of the hydraulic brake system. The latter source may be controlled by an electronic control unit (ECU) of the hydraulic brake system to pump the brake fluid to the vicinity of the bleed screw provided on the brake fluid loop, so that the air in the brake fluid loop gradually flows and aggregate at the position where the bleed screw is provided, for being exhausted. In view of this, instead of manually pressing the brake pedal to pump the brake fluid to the vicinity of the bleed screw in the existing method of filling and bleeding brake fluid, the present disclosure can implement the pumping of the brake fluid within the brake fluid loop under the control of ECU by accessing an on-board diagnostic (OBD) system of the vehicle and sending commands to the vehicle. On the other hand, instead of utilizing a wrench to tighten/loosen the bleed screw from time to time in the existing method of filling and bleeding brake fluid, the present disclosure proposes an approach to control the tightening/loosening state of the bleed screw by sending a wireless control signal, so that an exhaust device connected to the bleed screw can provide a rotation torque required for screwing the bleed screw under the action of the wireless control signal.

Figure 2:
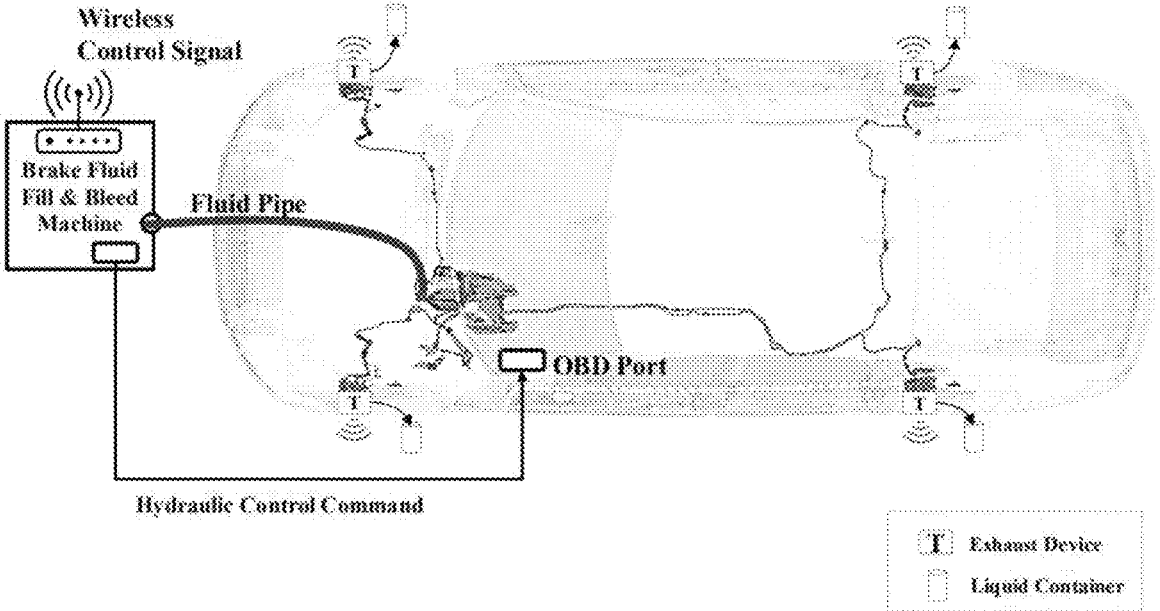
FIG. 2 shows an overall diagram of an architecture of a system for filling and bleeding brake fluid according to an embodiment of the present disclosure.

FIG. 2 shows an overall diagram of an architecture of a system for filling and bleeding brake fluid according to an embodiment of the present disclosure. As shown in FIG. 2, a brake fluid fill and bleed system 200 mainly includes a brake fluid fill and bleed machine and four exhaust devices (as indicated by marks "T") located in the vicinity of the four wheels, wherein each exhaust device is connected to a bleed screw provided in the vicinity of the corresponding wheel for actuating the tightening or loosening of that bleed screw. In an embodiment of the present disclosure, the brake fluid fill and bleed machine may integrate the following three functions required in the process of filling and bleeding brake fluid together, including: (1) with respect to the brake fluid reservoir of the vehicle, supplying supplementary brake fluid; (2) with respect to the hydraulic brake system of the vehicle, sending a hydraulic control command to pump brake fluid to the vicinity of the bleed screw provided on the brake fluid loop; (3) with respect to the bleed screws in the vicinity of the four wheels, sending a wireless control signal to actuate the tightening or loosening of the bleed screws. Accordingly, as shown in FIG. 2, respective interfaces of the brake fluid fill and bleed machine may be connected with respective units or modules of the vehicle or the exhaust devices to prepare for filling and bleeding brake fluid. Specifically, a liquid outlet of the brake fluid fill and bleed machine and a brake fluid reservoir in the front compartment of the vehicle are connected through a fluid pipe, thereby continuously supplying new brake fluid. In addition, a command output port of the brake fluid fill and bleed machine is connected to an OBD port in the cab of the vehicle through a cable, so that the hydraulic brake system of the vehicle establishes a hydraulic pressure in the brake fluid loop after receiving the command for pumping the brake fluid to the vicinity of the bleeding screw. In addition, a wireless transmitter of the brake fluid fill and bleed machine is wirelessly connected with a wireless receiver of the exhaust device, so that the tightening or loosening of the bleed screw is actuated under the action of a wireless control signal, and eventually the brake fluid bled from the bleed screw drives the air to be collected in the liquid container. In the following, the equipment and method for filling and bleeding brake fluid provided by the present disclosure will be described in detail, taken in conjunction with the accompanying drawings and examples.

Figure 3:
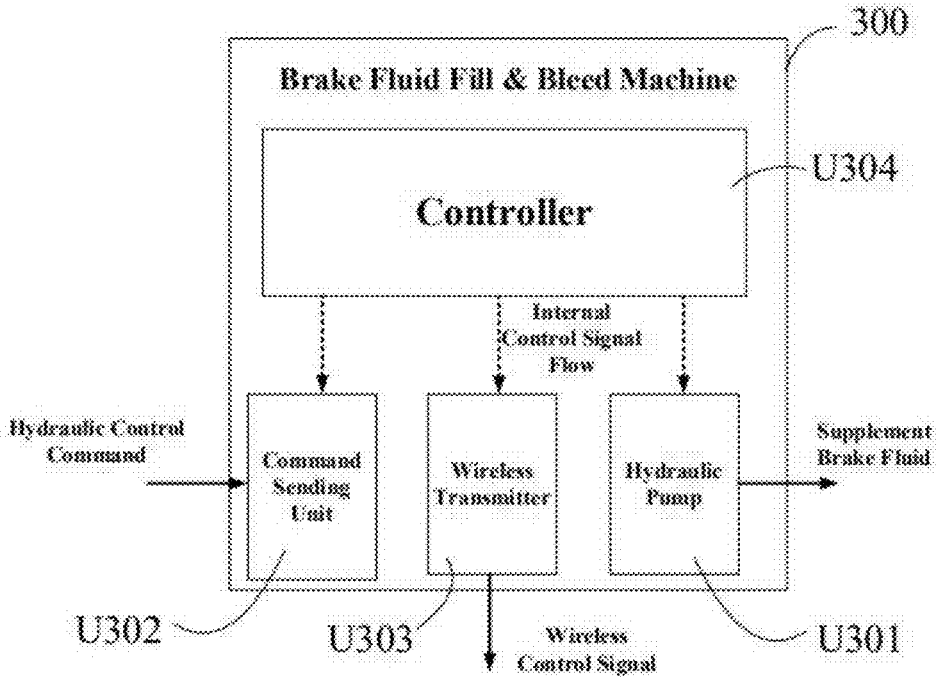
FIG. 3 shows a structural block diagram of equipment for filling and bleeding brake fluid according to an embodiment of the present disclosure.

First, equipment for filling and bleeding brake fluid according to an embodiment of the present disclosure will be described with reference to FIG. 3. FIG. 3 shows a structural block diagram of equipment for filling and bleeding brake fluid according to an embodiment of the present disclosure. As shown in FIG. 3, equipment 300 may include a hydraulic pump U301, a command sending unit U302 and a wireless transmitter U303.

The hydraulic pump U301 may supply brake fluid to the brake fluid reservoir of the vehicle. It can be understood that the hydraulic pump U301 may supplement new brake fluid to the brake fluid reservoir in various ways, and the specific manner of supplying brake fluid is not limited in the present disclosure. As a schematic example, the hydraulic pump U301 may pressurize the brake fluid and then inject it into the brake fluid reservoir of the vehicle through the fluid pipe. In one example, the hydraulic pump U301 may provide a pressure of about 1-4 bar.

The command sending unit U302 may send a command to the hydraulic brake system of the vehicle for pumping the brake fluid to the bleed screw provided on the brake fluid loop, so that the air in the brake fluid loop gradually flows and aggregates at the position where the bleed screw is provided, for being exhausted. As discussed above, considering that the electronic hydraulic pump of the hydraulic brake system can provide a source of hydraulic power, thus it can be controlled to establish a hydraulic pressure by means of sending an electronic command, thereby replacing the manual actuation of the brake pedal in the existing method. It can be understood that the electronic command can be distributed to the electronic hydraulic pump in the electronically controlled hydraulic brake system in various ways, so that the brake fluid is pumped to the vicinity of the bleeding screw by establishing the hydraulic pressure.

In an embodiment of the present disclosure, transmission and reception of the hydraulic control command and controlling of the hydraulic brake system may be performed by means of an OBD system of vehicle. The OBD system is a detection system extended for vehicle fault diagnosis, and it is widely used with the increasing degree of internationalization and standardization of the vehicle industry, and supports various communication protocols to provide useful diagnostic information to external equipment and/or receive control commands from the external equipment for purposes of controlling the vehicle. As a schematic example, the command sending unit U302 may send an on-board diagnostic (OBD) command to the electronic control unit of the vehicle's hydraulic brake system, so that the electronic control unit controls the electronic hydraulic pump of the hydraulic brake system to establish the hydraulic pressure in the brake fluid loop, thereby pumping the brake fluid to the vicinity of the bleed screw provided on the brake fluid loop.

It can be understood that in the electronic hydraulic brake system of the vehicle, the pumping of the electronic hydraulic pump and the opening and closing of respective electronic hydraulic valves may be controlled to pump the brake fluid to the vicinity of each bleed screw so as to exhaust air. For example, the brake fluid loop can be changed by controlling the opening and closing of each electronic hydraulic valve, so that the brake fluid together with the air contained therein are drained to the bleed screw for which an exhausting operation is needed, and in turn the bleed screw can be loosened to exhaust the air to the outside. The specific control modes for the electronic hydraulic pump and the electronic hydraulic valves of the electronic hydraulic brake system are not detailed here.

The wireless transmitter U303 may send a wireless control signal to the exhaust device connected to the bleed screw for actuating the tightening or loosening of the bleed screw. As a schematic example, the wireless transmitter U303 may send a wireless control signal to the wireless receiver of the exhaust device, so that an actuator of the exhaust device transfers a rotation torque to the bleed screw under the control of the received wireless control signal, thereby causing the bleed screw to be tightened or loosened. In an embodiment of the present disclosure, the wireless control signal may be sent to the exhaust device by means of Wi-Fi or Bluetooth. It can be understood that a plurality of structures can be adopted in the embodiment of the present disclosure to realize the design of the exhaust device, so as to control the tightening/loosening state of the bleed screw by sending wireless control signals, instead of manual operations by utilizing a wrench in the existing method. For completeness of the illustration only, a structural schematic diagram of an exemplary exhaust device according to an embodiment of the present disclosure will be described below in conjunction with FIG. 4.

Figure 4:
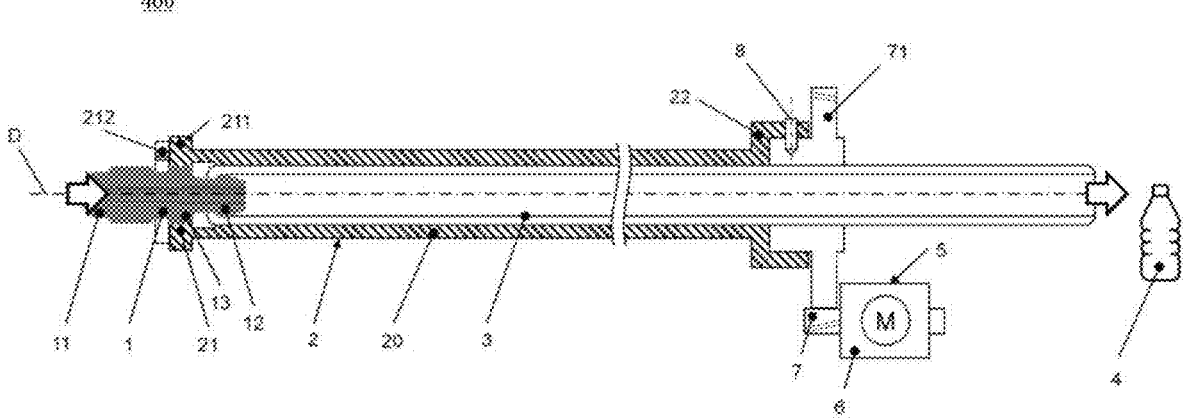
FIG. 4 shows a structural schematic diagram of an exemplary exhaust device according to an embodiment of the present disclosure.

FIG. 4 shows a structural schematic diagram of an exhaust device for a brake system according to at least one embodiment of the present disclosure. As shown in FIG. 4, an exhaust device 400 includes a hollow shaft 2, a liquid pipe 3 and an actuator 5. The hollow shaft 2 is rotationally and fixedly connected to a bleed screw 1, and it has a through hollow cavity. The liquid pipe 3 is provided in the hollow shaft 2, specifically in the hollow cavity. The liquid pipe 3 is used to bleed brake fluid and exhaust air possibly mixed in the brake fluid. The actuator 5 is used to actuate the hollow shaft 2 so as to actuate the tightening or loosening of the bleed screw 1. In the following, the connection relationship of each component and alternative embodiments will be described in detail in conjunction with FIG. 4.

The hollow shaft 2 includes a shaft main body 20, and a first end 21 and a second end 22 connected to the shaft main body 20 and opposite to each other. The first end 21 and the second end 22 are rigid, whereas the shaft main body 20 has flexibility. Specifically, the shaft main body 20 may be in the form of a corrugated pipe, which can be bent in the axial direction D, for example, into an arc shape, or even into a U shape, but has a certain rigidity in the circumferential direction. Therefore, although the hollow shaft 2 can be bent, it can still transfer a rotation torque while being bent. In this embodiment, the rotation torque received by the second end 22 can be transferred to the first end 21 through the shaft main body 20. The hollow shaft 2 is straight-through from the first end 21, through the shaft main body 20 and to the second end 22, and may have a uniform inner diameter, thereby allowing an outlet pipe such as the liquid pipe 3 to be inserted into. The first end 21 is in the form of a joint, and it may be rotationally and fixedly connected to the bleed screw 1. The second end 22 may be actuated to transfer the rotation torque to the first end 21 along the shaft main body 20, thereby actuating the tightening or loosening of the bleed screw 1.

According to the above features, the flexible hollow shaft 2 has many advantages: firstly, the hollow shaft 2 can be provided with the liquid pipe 3 in the hollow cavity for bleeding brake fluid, and meanwhile, the hollow shaft 2 can also transmit torque: secondly, the flexible hollow shaft 2 provides a more flexible operation mode in which, the hollow shaft 2 can be bent to adapt to the different positions of the bleed screws of the front and rear wheels, and the distances and angles between the actuator and the bleed screws can be adjusted according to the actual situation.

The connection mode between the first end 21 of the hollow shaft 2 and the bleed screw 1 will be exemplarily described in conjunction with FIG. 4. As shown in FIG. 4, the first end 21 is coaxially connected with the bleed screw 1. The bleed screw 1 may exemplarily include a plurality of sections, such as an inlet 11 connected to a brake fluid loop, an outlet 12 opposite to the inlet 11, an outer hexagonal joint 13 interposed between the inlet 11 and the outlet 12, and a clamping groove adjacent to the outer hexagonal joint 13 and close to the side of the inlet 11. In the tightening state, the inlet 11 is disconnected from the brake fluid loop, whereas in the loosening state, the inlet 11 is in fluid communication with the brake fluid loop, thereby allowing the brake fluid to flow through the inlet 11 and eventually bleed from the outlet 12.

The first end 21 of the hollow shaft 2 may include an inner hexagonal portion 211 engaged with the outer hexagonal joint 13 of the bleed screw 1, to be rotationally and fixedly connected to the bleed screw 1.

In order to axially fix the first end 21 and the bleed screw 1, optionally, the first end 21 may further include a locking portion 212. The locking portion 212 may be, for example, in the form of a buckle, and is clamped at the position of the clamping groove of the bleed screw 1 to limit the relative movement of the hollow shaft 2 and the bleed screw 1 in the axial direction D, thereby fixedly connecting the first end 21 to the bleed screw 1.

The inlet 11 of the bleed screw 1 is connected to the brake fluid loop, and the other side is the outlet 12. The inlet 11 is in fluid communication with the outlet 12. One end of the liquid pipe 3 is hermetically connected to the outlet of the bleed screw 1, and the other end is connected to the liquid container 4, so as to collect the brake fluid bled from the bleed screw 1 to the liquid container 4. The liquid container 4 is a container for accommodating brake fluid, which may be, for example, a transparent bottle made of plastic. Exemplarily, at the outlet, the bleed screw 1 may be provided with a tapered portion, which may be inserted into one end of the liquid pipe 3 and achieve physical sealing. The liquid pipe 3 may be, for example, a latex liquid pipe, and its length may be greater than that of the hollow shaft 2. During installation, the liquid pipe 3 may be first hermetically connected to the bleed screw 1, then the first end of the hollow shaft 2 may be inserted from the other end of the liquid pipe 3 and installed to the bleed screw 1, and finally the actuator 5 may be connected to the second end 22 of the hollow shaft 2.

In one example, the actuator 5 is in transmission connection with the second end 22 of the hollow shaft 2 so as to actuate the hollow shaft 2. For example, the actuator 5 may provide a rotation torque of at most 20 N·m. In this embodiment, the actuator 5 may include a motor 6 and a decelerator 7, and the motor 6 is in transmission connection with the decelerator 7. The decelerator 7 may include an output shaft 71, which is coaxially provided with the hollow shaft 2, especially with the second end 22 of the hollow shaft 2, so as to eventually output the torque of the decelerated motor 6 and transfer it to the second end 22. The output shaft 71 is fixedly connected to the second end 22, and is provided with a through hole in the axial direction D, so as to allow the liquid pipe 3 to pass through. For example, the output shaft 71 and the second end 22 may also be provided in the form of outer hexagon joint engaged with inner hexagon joint, so as to form a rotary fixed connection, and the second end 22 may be provided with a threaded hole perpendicular to the axial direction D. A positioning pin 8 passes through the threaded hole to press against the output shaft 71, thereby axially fixing the output shaft 71, and in turn fixedly connecting the output shaft 71 with the second end.

It should be indicated that the decelerator 7 may not be necessary. In an alternative embodiment, the actuator 5 may include the motor 6 only, and the output end of the motor 6 is in transmission connection with the second end 22 directly for actuating rotation of the hollow shaft 2 and eventually actuating the tightening or loosening of the bleed screw 1.

Therefore, the tightening or loosening of the bleed screw 1 may be actuated by controlling the rotation of the motor 6, without manually tightening/loosening the bleed screw from time to time utilizing a wrench, thus saving labor and time cost.

In order to wirelessly control the tightening/loosening of the bleed screw, the exhaust device 400 further includes a wireless receiver configured to receive a wireless control signal, according to which the actuator 5 actuates the tightening or loosening of the bleed screw 1. In this way, the tightening/loosening state of the bleed screw is controlled by means of sending a wireless control signal, so that the exhaust device can provide the rotation torque required for screwing the bleed screw under the action of the wireless control signal.

Optionally, the exhaust device 400 may further include a mounting bracket, which may be configured to mount the actuator 5 to the inner side of the vehicle wheel hub, thereby providing a reliable and convenient fixation for the actuator 5. It should be noted that "inner side" refers to the side of the vehicle hub close to the cockpit. Optionally, the actuator 5 may also be connected to a fixed base provided outside the vehicle.

It should be noted that the "exhaust device" described herein is a device for actuating the tightening or loosening of bleed screw. By actuating the tightening or loosening of the bleed screw, the exhaust device can simply and efficiently fill and bleed brake fluid and/or exhaust air in brake fluid loop. The exhaust device may be electrically driven under the cooperation with an actuator such as a motor assembly, and has the advantages that: automatic air exhausting operation can be implemented by means of an actuator, the operation is flexible, the structure is simple, and the labor and time costs are saved. It can be understood that the structure of the exhaust device described above with reference to FIG. 4 is merely a schematic example, and other suitable structures can also be adopted in the present disclosure to implement the electrical actuation of the bleed screw.

Returning to FIG. 3, the equipment 300 may further include a controller U304 to control the overall operations of the hydraulic pump U301, the command sending unit U302 and the wireless transmitter U303. As discussed above, in the process of filling and bleeding brake fluid, once two operators fail to apply the strength, timing, etc., in pressing/releasing the brake pedal and tightening/loosening the bleed screw accurately, or an error occurs in the cooperation among various operations, consequences such as incomplete bleeding of old brake fluid or incomplete exhausting of air may occur. In view of this, it is necessary to formulate a standardized operation sequence, so as to standardize various operations to be performed by the hydraulic pump U301, the command sending unit U302 and the wireless transmitter U303 in the process of filling and bleeding brake fluid, such as the chronological order of various operations, the duration and time interval of various operations, the control command parameters involved in various operations, and so on. Accordingly, as depicted by the internal control flow in FIG. 3, the controller U304 may control the operations of the hydraulic pump U301, the command sending unit U302 and the wireless transmitter U303 according to the standardized operation sequence.

As described above, the OBD system can support various communication protocols to provide useful diagnostic information to external equipment and/or receive control commands from the external equipment for purposes of controlling the vehicle. In order to standardize vehicular diagnosis, OBD-related standards have been formulated in the vehicle industry, so that various vehicle manufacturers need to follow the interface definitions, protocol specifications, data command formats and so on under the OBD standard for industry promotion. In view of this, standardized OBD interfaces can be utilized in the present disclosure to control the hydraulic brake system of the vehicle, so that the brake fluid can be pumped in the brake fluid loop sufficiently so as to reach the vicinity of the bleed screw, so that the air in the brake fluid loop gradually flows and aggregates at the position where the bleed screw is arranged, for being exhausted. In this way, the application of the equipment for filling and bleeding brake fluid proposed in the present disclosure w % ill not be limited by specific vehicle models. As long as the vehicle has an OBD system and is equipped with an electronic hydraulic brake system, the equipment can be controlled utilizing standardized OBD commands, which has wide applicability and is conducive to the promotion in this industry of the standardized flow for filling and bleeding brake fluid.

At the same time, considering the risk that the OBD interface of the vehicle may be illegally accessed and thus malicious control instructions may be received, it is necessary to determine whether the external equipment accessing the vehicle is an authorized safety equipment from the perspective of safety, so as to avoid the threat to driving safety caused by the vehicle's OBD interface being maliciously accessed. In view of this, the controller U304 can also determine whether the equipment 300 has the permission to fill and bleed brake fluid for the vehicle, and only when it has the permission, the operations of the hydraulic pump U301, the command sending unit U302 and the wireless transmitter U303 are controlled according to the standardized operation sequence. As a schematic example, the equipment 300 may obtain the authorization of the vehicle manufacturer in advance, so as to have the permission (e.g., electronic key, serial number, etc.) to access/control the OBD system of the vehicle manufacturer. Thereafter, after connecting the equipment 300 to the vehicle to be exhausted, the user may input the vehicle model into the input interface (e.g., keyboard, touch screen, etc.) of this equipment 300, and then the controller U304 may automatically determine whether the equipment 300 has the corresponding permission, and prevent the subsequent accessing operation when it does not have the permission, so as to ensure the safety of the vehicle system. In this way, by utilizing the standardized OBD system in the vehicle to implement the process of filling and bleeding brake fluid, not only can the standardized process of filling and bleeding brake fluid be promoted in this industry, but also the safety of the OBD system of the vehicle can be ensured to prevent malicious intrusion.

It can be understood that although the application of equipment and method for filling and bleeding brake fluid based on OBD system proposed in the present disclosure will not be limited by specific vehicle models, the standardized operation sequence described above may be specific to vehicle model, that is, each vehicle model has its own unique standardized sequence to meet its personalized needs. In an embodiment of the present disclosure, the standardized operation sequence may include at least operations in the following order:

(A) Hydraulic pump starting operation, for supplying the brake fluid to the brake fluid reservoir:

(B) Brake fluid pumping operation, for controlling the electronic hydraulic pump and electronic hydraulic valves of the hydraulic brake system to pump the brake fluid to the bleed screw through the brake fluid loop;

(C) Bleed screw loosening operation, for loosening the bleed screw to exhaust air;

(D) Bleed screw tightening operation, for tightening the bleed screw after a predetermined time period; and (E) Hydraulic pump stopping operation, for stopping the supplying of the brake fluid.

It should be noted that the above-mentioned operations (A)-(E) may be described with respect to an air exhausting process to be performed for the bleed screw at a brake caliper of one of the wheels of the vehicle. Moreover, before operations (A)-(E), an instruction may be sent to the OBD system of the vehicle to make its hydraulic brake system to be in a test mode, thereby allowing the hydraulic pressure establishment process of the electronic hydraulic pump to be controlled by means of external equipment sending electronic commands. In addition, for each of operations (A)-(E), specific command parameters of the operation may be involved. For example, for the hydraulic pump starting operation, the above standardized operation sequence may include parameters for pressurizing new brake fluid when supplementing the new brake fluid in operation (A), so as to inject the pressurized brake fluid into the brake fluid reservoir. For another example, for the brake fluid pumping operation, the above standardized operation sequence may include parameters for the hydraulic pressure required to be established by the electronic hydraulic pump in order to pump the brake fluid to the vicinity of the bleed screw in operation (B), so as to pump the brake fluid sufficiently to the vicinity of the bleed screw with a suitable hydraulic pressure to exhaust air. For another example, for the bleed screw tightening operation, the above standardized operation sequence may include parameters for the time delay in operation (D), so as to avoid the result that the air is not fully exhausted due to premature tightening of the bleed screw, or the result that the whole operation flow is unnecessarily prolonged or that the air is reversely introduced into the brake fluid loop of the hydraulic brake system due to late tightening of the bleed screw. For the remaining wheels of the vehicle, the above operations (A)-(E) may be repeated to implement the exhausting process of the bleed screws at other wheels. As a schematic example, exhausting operations may be performed in the order of right front wheel, right rear wheel, left rear wheel and left front wheel, and the present disclosure does not limit the exhausting order of the wheels. In addition, in a process of filling and bleeding the brake fluid, one or more exhausting operations can be performed with respect to any one or more wheels, so as to completely bleed the old brake fluid and exhaust the residual air and fill the new brake fluid. As a schematic example, an exhaust process may be performed for one time in the order of right front wheel, right rear wheel, left rear wheel and left front wheel, after which the exhaust process may continue and be performed one or more times in the same order of right front wheel, right rear wheel, left rear wheel and left front wheel. The present disclosure is not limited to this.

In other words, the standardized sequence according to the embodiment of the present disclosure may include a routine program composed of any combination of operations (A)-(E), and may be stored in the equipment 300 for subsequent call at any time. In this way, for any vehicle model to be exhausted for the brake system, it merely needs to simply call the standardized operation sequence corresponding to the vehicle model, and then the standardized operations can be performed in a strict order under the overall control of the controller U304. For example, the chronological order of various operations of the hydraulic pump U301, the command sending unit U302 and the wireless transmitter U303, the duration and time interval of the various operations, the control command parameters involved in the various operations, etc., are strictly controlled in accordance with the standardized procedure, so as to avoid the consequences in the existing methods for filling and bleeding manual brake fluid, such as incomplete exhausting of air due to the operator's failure to apply the strength or timing, etc., of the operations accurately or an error occurring in the cooperation among various operations.

On the other hand, in the existing methods for filling and bleeding brake fluid, whether the air in the brake fluid loop is evacuated depends on empirical determination. For example, the operator is required to closely observe the brake fluid bled from the bleed screw, and when there is no bubble in the brake fluid, he or she determines that the replacement of brake fluid has been completed and ends the whole workflow. However, this kind of observing method by human eyes greatly depends on the experience of the operator, and there are still cases where the air in the brake fluid is not evacuated but is wrongly determined as having been replaced completely, leading to a certain failure rate in brake fluid replacement, thus requiring rework process or may even lead to occurrence of safety accidents. In view of this, the standardized operation sequence according to the embodiment of the present disclosure further includes: (F) Air checking operation, for sending an on-board diagnostic (OBD) command to check whether there is air in the brake fluid loop. As discussed above, once there is air in the enclosed loop system of the brake system, the air in the loop will be compressed first during braking, and then the brake fluid can be driven to move, thereby increasing the brake reaction time. In view of this, in one example, the air checking operation may include: causing the electronic hydraulic pump to pump brake fluid to the brake wheel cylinder by sending an OBD command so as to pressurize the brake wheel cylinder, and determining the time required to reach a specific pressure, from which the air content in the brake fluid is derived. For example, the pressure of the brake wheel cylinder may be monitored by a pressure sensor and the time required to reach a predetermined pressure (e.g., 50 bar) may be determined, wherein the longer the required time is, the more air remains in the brake fluid, whereas the shorter the required time is, the air in the brake fluid has been exhausted more thoroughly. In this case, when the air check fails, (A)-(E) are repeated until the air check passes. It can be understood that when the air check passes, it can be determined that a qualified process for filling and bleeding brake fluid is completed. At this time, a command may be sent to the OBD system of the vehicle again to make its hydraulic brake system exit the test mode, thereby allowing the hydraulic brake system of the vehicle to function normally. Eventually the equipment 300 can be disconnected from the vehicle and the exhaust device, thereby completing the after-sales maintenance task for delivery.

The equipment for filling and bleeding brake fluid according to the embodiment of the present disclosure has been described above in conjunction with the accompanying drawings. By utilizing this equipment to fill and bleed brake fluid, the workflow of filling and bleeding operation can be completed simply and efficiently. The equipment for filling and bleeding brake fluid proposed by the present disclosure has the following beneficial technical effects:

1. Saving labor costs. By using the equipment for filling and bleeding brake fluid proposed in the present disclosure, only one operator is needed to complete the whole task flow of filling and bleeding brake fluid. It can effectively save the overhead of labor costs, compared with the traditional purely manual method for filling and bleeding.

2. Standardization of task flow. By using the equipment for filling and bleeding brake fluid provided by the present disclosure, it is possible to control various operations involved in the process of filling and bleeding brake fluid to be performed in a strict order, according to the standardized operation sequence, thus effectively avoiding human errors due to inexperienced operators, inaccurate application of operation's strength or timing, or poor cooperation, and ensuring a high-quality of the results of the task of filling and bleeding brake fluid. Moreover, with the help of the air checking operation in the standardized operation sequence, the uncertainty of air bubble check by manual visual method can be avoided, thus ensuring the reliability of the results of the task of filling and bleeding brake fluid.

3. Saving time costs. By using the equipment for filling and bleeding brake fluid proposed by the present disclosure, it is possible to control the pumping of brake fluid to the bleed screw and the tightening/loosening of the bleed screw by means of electronic commands, which effectively saves time, compared with manual operation. At the same time, there is no need to disassemble the wheels when the bleed screw is being tightened or loosened, thus saving the time spent in disassembling the wheels in the existing method for filling and bleeding brake fluid.

4. Operation-friendly. By using the equipment for filling and bleeding brake fluid provided by the present disclosure, it is possible to control the pumping of brake fluid to the bleed screw and the tightening/loosening of the bleed screw by means of electronic commands, thus avoiding the need of manually pressing the brake pedal arduously, and also avoiding the need for an operator to move among the respective wheels to manually screw every bleed screw with a wrench, thus effectively reducing the burden of the manual labor of the operator.

Next, a system for filling and bleeding brake fluid according to an embodiment of the present disclosure will be described. In an embodiment of the present disclosure, the system for filling and bleeding brake fluid may include a brake fluid fill and bleed machine and an exhaust device. Referring back to FIG. 2, an exemplary brake fluid fill and bleed system may include a brake fluid fill and bleed machine and four exhaust devices (as indicated by marks "T") located in the vicinity of four wheels, wherein each exhaust device is connected to a bleed screw provided in the vicinity of a corresponding wheel for actuating tightening or loosening of the bleed screw.

The brake fluid fill and bleed machine in this system may have the configuration of the equipment for filling and bleeding brake fluid described with reference to FIG. 3, which includes at least a hydraulic pump, a command sending unit and a wireless transmitter, wherein: the hydraulic pump is configured to supply brake fluid to a brake fluid reservoir of a vehicle; the command sending unit is configured to send a command to a hydraulic brake system of the vehicle for pumping the brake fluid to a bleed screw provided on a brake fluid loop; and the wireless transmitter is configured to send a wireless control signal to an exhaust device connected to the bleed screw for actuating tightening or loosening of the bleed screw. The exhaust device in this system may have the structure of the exemplary exhaust device described with reference to FIG. 4, which is connected to the bleed screw and includes at least a wireless receiver and an actuator, wherein: the wireless receiver is configured to receive the wireless control signal; and the actuator is configured to transfer a rotation torque to the bleed screw according to the wireless control signal for actuating tightening or loosening of the bleed screw. Each component described may have the same structure and function as those described above with reference to FIGS. 3 and 4, and will not be detailed here.

Next, a method for filling and bleeding brake fluid according to an embodiment of the present disclosure will be described with reference to FIGS. 5 and 6. Each step of the method for filling and bleeding brake fluid according to the embodiment of the present disclosure may be performed by means of the equipment for filling and bleeding brake fluid as described above. In order to avoid repetition, only a brief description of the method will be given below, whereas a detailed description of the same details will be omitted.

Figure 5:
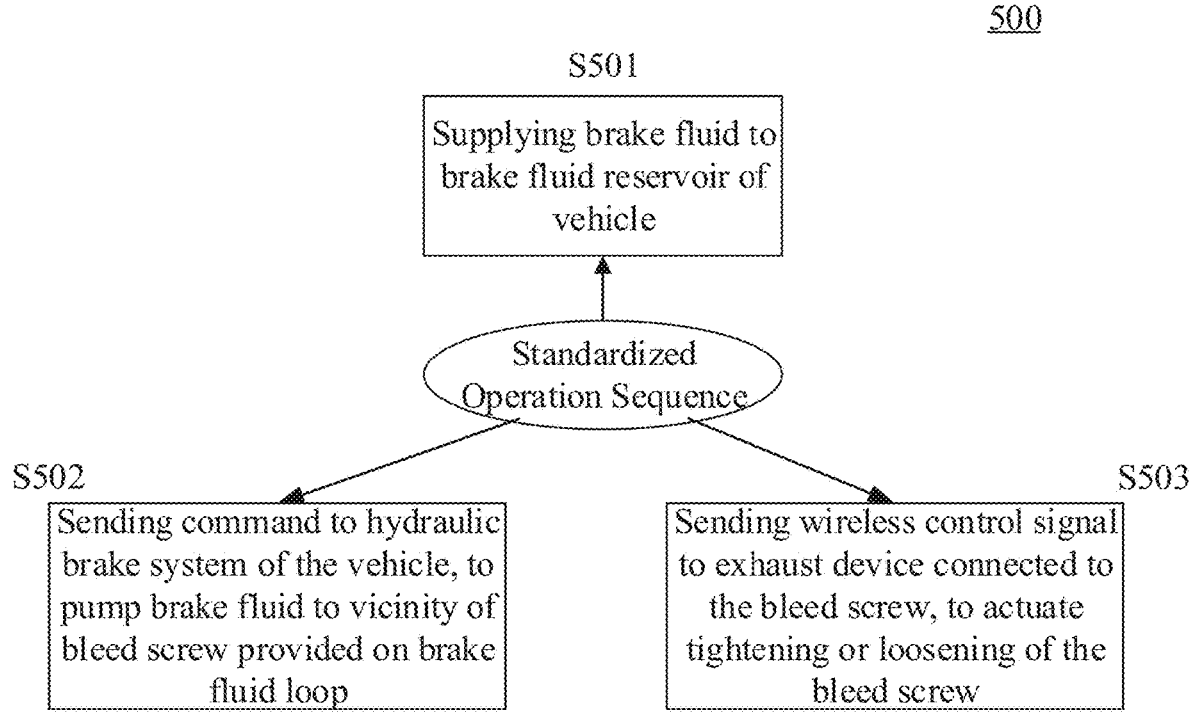
FIG. 5 shows a flowchart of an example of a method for filling and bleeding brake fluid according to an embodiment of the present disclosure.

FIG. 5 shows a flowchart of a method 500 for filling and bleeding brake fluid according to an embodiment of the present disclosure. As shown in FIG. 5, in step S501, the brake fluid may be supplied to the brake fluid reservoir of the vehicle. It can be understood that the supplying of supplementary brake fluid may be implemented by the hydraulic pump U301 of the brake fluid fill and bleed equipment 300 described above with reference to FIG. 3. In this step S501, the brake fluid may be pressurized and then injected into the brake fluid reservoir of the vehicle through the fluid pipe.

In step S502, a command may be sent to the hydraulic brake system of the vehicle to pump the brake fluid to the air bleed screw provided on the brake fluid loop. It can be understood that the sending of the hydraulic control command may be implemented by the command sending unit U302 of the brake fluid fill and bleed equipment 300 described above with reference to FIG. 3. In this step S502, the transmission and reception of the hydraulic control command and the controlling of the hydraulic brake system may be performed by means of the OBD system of the vehicle. As a schematic example, an on-board diagnostic (OBD) command may be sent to the electronic control unit of the hydraulic brake system of the vehicle, so that the electronic control unit controls the electronic hydraulic pump of the hydraulic brake system to establish a hydraulic pressure in the brake fluid loop, thereby pumping the brake fluid to the vicinity of the bleed screw provided on the brake fluid loop, so that the air in the brake fluid loop gradually flows and aggregates at the position where the bleed screw is arranged, for being exhausted. It can be understood that in the electronic hydraulic brake system of the vehicle, the pumping of the electronic hydraulic pump and the opening and closing of each electronic hydraulic valve may be controlled to pump the brake fluid to the vicinity of each bleed screw for exhausting.

In step S503, a wireless control signal may be sent to an exhaust device connected to the bleed screw for actuating tightening or loosening of the bleed screw. It can be understood that the tightening or loosening of the bleed screw may be implemented by the wireless transmitter U303 of the brake fluid fill and bleed equipment 300 described above with reference to FIG. 3. In this step S503, a wireless control signal may be sent to the wireless receiver of the exhaust device, so that the actuator of the exhaust device transfers a rotation torque to the bleed screw under the control of the received wireless control signal, thereby causing the bleed screw to be tightened or loosened. For example, the wireless control signal may be sent to the exhaust device by means of Wi-Fi or Bluetooth. It can be understood that the exhaust device used in the embodiment of the present disclosure may have an exemplary structure as described in FIG. 4, so as to control the tightening/loosening state of the bleed screw by means of sending a wireless control signal.

It should be noted that although the respective method steps involved in the process of filling and bleeding brake fluid are described above in the order of S501-S503, the above describing order should not be understood as limiting the execution order of respective steps. In fact, as described above, it is required to formulate a standardized operation sequence, so as to standardize the order and parameters of the operations of supplying brake fluid to the brake fluid reservoir, sending a command to the hydraulic brake system and sending a wireless control signal to the exhaust device during filling and bleeding brake fluid. Accordingly, in the embodiment of the disclosure, the operations of supplying brake fluid to the brake fluid reservoir, sending a command to the hydraulic brake system and sending a wireless control signal to the exhaust device are controlled according to the standardized operation sequence. It can be understood that the standardized operation sequence may be specific to vehicle model, that is, each vehicle model has its own unique standardized sequence to meet its personalized needs. In an embodiment of the present disclosure, the standardized operation sequence may include at least the following operations:

(A) Hydraulic pump starting operation, for supplying the brake fluid to the brake fluid reservoir;

(B) Brake fluid pumping operation, for controlling an electronic hydraulic pump and electronic hydraulic valves of the hydraulic brake system to pump the brake fluid to the bleed screw through the brake fluid loop;

(C) Bleed screw loosening operation, for loosening the bleed screw to exhaust air;

(D) Bleed screw tightening operation, for tightening the bleed screw after a predetermined time period; and (E) Hydraulic pump stopping operation, for stopping the supplying of the brake fluid.

It should be noted that the above-mentioned operations (A)-(E) may be described with respect to an air exhausting process to be performed for the bleed screw at a brake caliper of one of the wheels of the vehicle. Moreover, before operations (A)-(E), an instruction may further be sent to the OBD system of the vehicle to make its hydraulic brake system to be in a test mode, thereby allowing the hydraulic pressure establishment process of the electronic hydraulic pump to be controlled by means of external equipment sending electronic commands. In addition, for each of operations (A)-(E), specific command parameters of the operation may be involved. For the remaining wheels of the vehicle, the above operations (A)-(E) may be repeated to implement the exhausting process of the bleed screws at other wheels.

In addition, the standardized operation sequence according to the embodiment of the present disclosure further includes: (F) an air checking operation, for sending an on-board diagnostic (OBD) command to check whether there is air in the brake fluid loop. In this case, when the air check fails, (A)-(E) are repeated until the air check passes. It can be understood that when the air check passes, it can be determined that a qualified process for filling and bleeding brake fluid is completed. At this time, an instruction may be sent to the OBD system of the vehicle again to make its hydraulic brake system exit the test mode, thereby allowing the hydraulic brake system of the vehicle to function normally.

Figure 6:
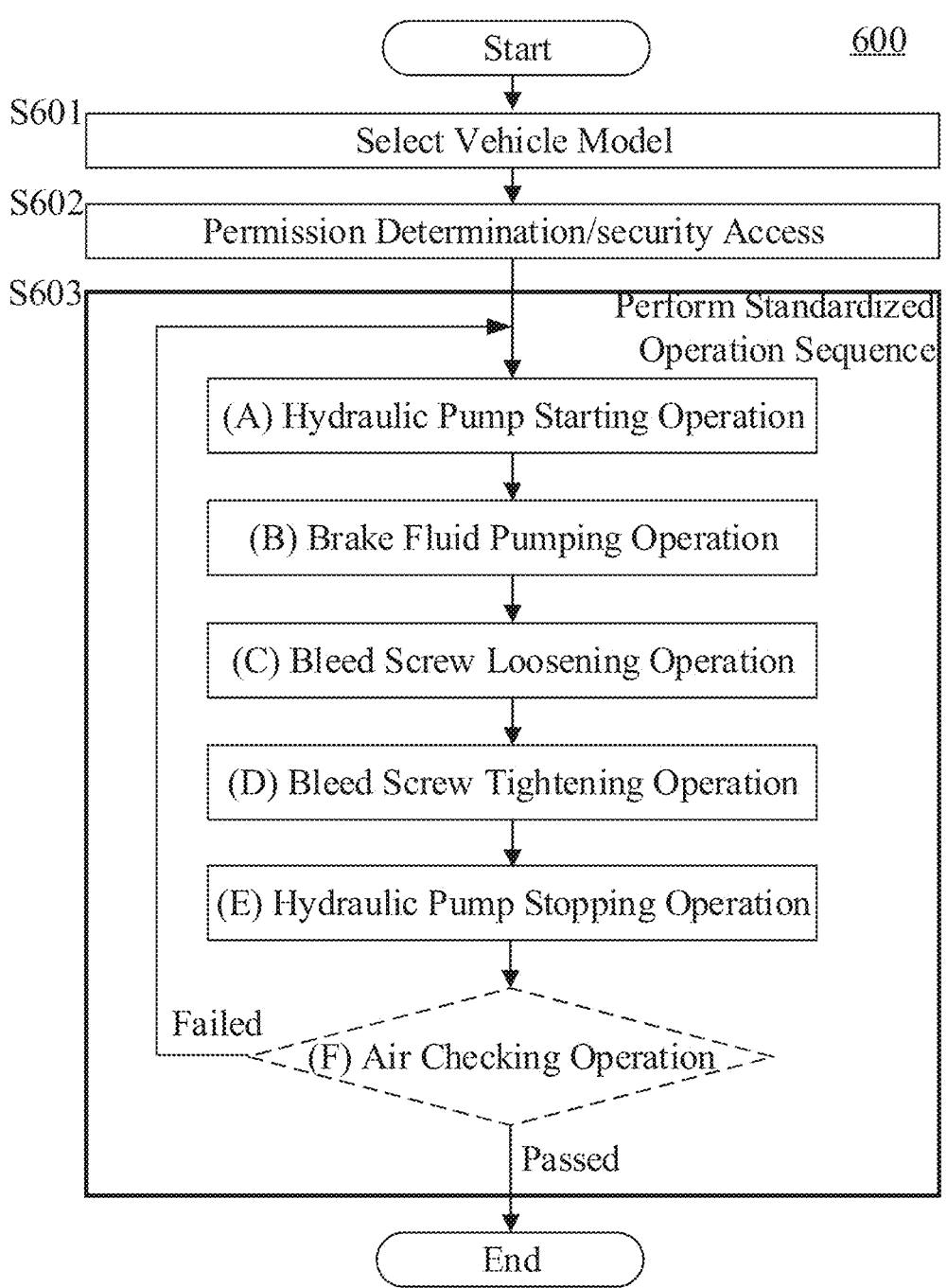
FIG. 6 shows a flowchart of another example of a method for filling and bleeding brake fluid according to an embodiment of the present disclosure.

FIG. 6 shows a flowchart of a method 600 for filling and bleeding brake fluid according to an embodiment of the present disclosure. Compared with FIG. 5, FIG. 6 focuses on describing the method for filling and bleeding brake fluid according to the embodiment of the present disclosure from the perspective of user's operation. As shown in FIG. 6, respective interfaces of the brake fluid fill and bleed machine may be connected with respective units or modules of the vehicle or the exhaust devices at first, so as to prepare for filling and bleeding brake fluid. For example, a liquid outlet of the brake fluid fill and bleed machine and a brake fluid reservoir in the front compartment of the vehicle are connected through a fluid pipe, thereby continuously supplying new brake fluid. In addition, a command output port of the brake fluid fill and bleed machine is connected to an OBD port in the cab of the vehicle through a cable, so that the hydraulic brake system of the vehicle establishes a hydraulic pressure in the brake fluid loop after receiving the command for pumping the brake fluid to the vicinity of the bleeding screw. In addition, a wireless transmitter of the brake fluid fill and bleed machine is wirelessly connected with a wireless receiver of the exhaust device, so that the tightening or loosening of the bleed screw is actuated under the action of a wireless control signal, after which the task of filling and bleeding brake fluid can be started.

As shown in FIG. 6, in step S601, the user may select a vehicle model in an input interface of the brake fluid fill and bleed machine. As described above, the standardized operation sequence may be specific to vehicle model, that is, each vehicle model has its own unique standardized sequence to meet its personalized needs. Accordingly, in this step S601, the user may provide the vehicle model through input devices, such as keyboard, touch screen and the like, of the brake fluid fill and bleed machine, so that the standardized sequence corresponding to the vehicle model can be called subsequently, that is, operations, such as supplying brake fluid to the brake fluid reservoir, sending a command to the hydraulic brake system, sending a wireless control signal to the exhaust device and the like, can be performed in a strict order.

In step S602, the permission to the operation of the brake fluid fill and bleed machine may be determined for safety access. As described above, considering the risk that the OBD interface of the vehicle might be illegally accessed, it is required to determine whether the external equipment accessing the vehicle (i.e., the brake fluid fill and bleed machine) is an authorized safety equipment from the perspective of safety. In view of this, in this step S602, it can be determined whether the brake fluid fill and bleed machine has the permission to fill and bleed brake fluid for the vehicle, and only when it has the permission, the operations of supplying brake fluid to the brake fluid reservoir, sending a command to the hydraulic brake system and sending a wireless control signal to the exhaust device can be controlled according to the standardized operation sequence. For example, it can be determined whether the brake fluid fill and bleed machine has the authorization provided in advance by the vehicle manufacturer, such as electronic key, serial number, etc., and subsequent operations can be prevented when it does not have the permission, so as to ensure the safety of the vehicle system.

In step S603, the standardized operation sequence may be performed in order to sufficiently remove air from the brake fluid loop. As shown in FIG. 6, the standardized sequence may include the operations (A)-(E) described above, and will not be detailed here. Of course, it can be understood that the standardized sequence according to the embodiment of the present disclosure may include routine programs composed of other combinations of operations (A)-(E) for subsequent call at any time. In this way, for any vehicle model to be exhausted for the brake system, it merely needs to simply call the standardized operation sequence corresponding to the vehicle model, and then the standardized operations can be performed in a strict order under its overall control, so as to avoid consequences in the existing methods for filling and bleeding manual brake fluid, such as incomplete exhausting of air, due to the operator's failure to apply the strength or timing, etc., of the operations accurately or an error occurring in the cooperation among various operations. In addition, as described above, the standardized operation sequence according to the embodiment of the present disclosure further includes: (F) Air checking operation, for sending an on-board diagnostic (OBD) command to check whether there is air in the brake fluid loop, and when the air check fails, (A)-(E) are repeated until the air check passes. In the embodiment of the present disclosure, the execution of the standardized operation sequence may be transparent to the user, that is, the user can simply call this standardized routine to complete the task of filling and bleeding brake fluid with high quality, without knowing the specific implementation of internal program code, which reduces the complexity of the filling and bleeding task and reduces the requirements for the operator's experience.

It should be noted that at the beginning of the execution of the standardized operation sequence, an instruction may be sent to the OBD system of the vehicle to place its hydraulic brake system in the test mode, so as to allow to perform an exhausting operation on the brake fluid of the vehicle by accessing the OBD system. At the end of the execution of the standardized operation sequence, an instruction may be sent to the OBD system of the vehicle to make its hydraulic brake system exit the test mode. The above operation for setting the test mode can also be considered as a part of the standardized operation sequence, or can be considered as a separate operation performed at the beginning and the end of the standardized operation sequence, and the present disclosure is not limited thereto.

The method for filling and bleeding brake fluid according to the embodiment of the present disclosure has been described above in conjunction with the accompanying drawings. By utilizing this method to fill and bleed brake fluid, the filling and bleeding task flow can be completed simply and efficiently. The method for filling and bleeding brake fluid proposed by the present disclosure has beneficial technical effects such as saving labor cost, standardization of task flow, saving time cost, being operation-friendly and the like.

The method/equipment/system for filling and bleeding brake fluid according to the present disclosure may also be implemented by providing a computer program product containing program codes for implementing the said method or device, or may be implemented by any storage medium storing such a computer program product. For example, according to another aspect of the present disclosure, there is provided equipment for filling and bleeding brake fluid, implemented by means of a storage medium, which stores computer program instructions, and the equipment 700 for filling and bleeding brake fluid will be described in detail in conjunction with FIG. 7.

Figure 7:
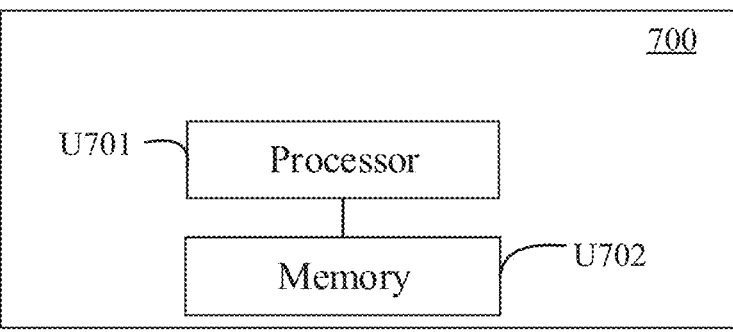
FIG. 7 shows a hardware block diagram of equipment for filling and bleeding brake fluid according to an embodiment of the present disclosure.

FIG. 7 shows a hardware block diagram of equipment for filling and bleeding brake fluid according to an embodiment of the present disclosure. As shown in FIG. 7, the equipment 700 includes a processor U701 and a memory U702.

The processor U701 may be any device with processing capability that can implement the functions of various embodiments of the present disclosure, for example, it may be a general-purpose processor, a digital signal processor (DSP), an ASIC, a field programmable gate array signal (FPGA) or other programmable logic device (PLD), discrete gate or transistor logic, discrete hardware components or any combination thereof designed to perform the functions described herein.

The memory U702 may include computer system readable media in the form of volatile memory, such as random access memory (RAM) and/or cache memory, and may also include other removable/non-removable, volatile/nonvolatile computer system memories, such as hard disk drive, floppy disk, CD-ROM, DVD-ROM or other optical storage media.

In this embodiment, the memory U702 has computer program instructions stored therein, and the processor U701 may execute the instructions stored in the memory U702. When the computer program instructions are executed by the processor, the processor is caused to execute the method for filling and bleeding brake fluid according to the embodiment of the present disclosure. The method for filling and bleeding brake fluid is basically the same as that described above with reference to FIGS. 5-6, and therefore, in order to avoid repetition, it will not detailed here.

The basic principles of the present disclosure have been described above in conjunction with specific embodiments, but it should be indicated that the advantages, strengths and effects mentioned in the embodiment of the present disclosure are merely examples rather than limitations, and such advantages, strengths and effects cannot be considered as necessary for every embodiment of the present disclosure. In addition, the specific details disclosed above are only for the purpose of illustration and easy understanding, but not for limitation, and the above details do not limit that the present disclosure must be implemented employing the above specific details.

The block diagrams of devices, equipment, devices and systems involved in the embodiment of the present disclosure are merely illustrative examples and are not intended to require or imply that they must be connected, arranged and configured in the manner shown in the block diagram. As those skilled in the art will recognize, such devices, equipment and systems can be connected, arranged and configured in any manner Words such as "including", "containing", "having" and so on, which are open terms, refer to "including but not limited to" and can be used interchangeably therewith. The terms of "or" and "and" as used herein refer to the term of "and/or" and can be used interchangeably therewith, unless the context clearly indicates otherwise. The word of "such as" as used herein refers to the phrase of "such as but not limited to" and can be used interchangeably there with.

In addition, as used herein, the "or" used in the enumeration of items starting with "at least one of" indicates a separate enumeration, so that, for example, the enumeration of "at least one of A, B or C" means A or B or C, or AB or AC or BC, or ABC (i.e. A and B and C). Furthermore, the word of "exemplary" does not mean that the described example is preferred or better than other examples.

It should also be indicated that in the equipment and method of the present disclosure, respective components or steps can be decomposed and/or recombined. Such decomposition and/or recombination should be regarded as equivalent solutions of the present disclosure.

For ordinary skilled in the art, it can be understood that all or any part of the method and equipment disclosed in the present disclosure can be implemented in hardware, firmware, software or their combination in any computing device (including processor, storage media, etc.) or any network of computing device. The hardware may be a general-purpose processor, a digital signal processor (DSP), an ASIC, a field programmable gate array signal (FPGA) or other programmable logic device (PLD), discrete gate or transistor logic, discrete hardware components, or any combination thereof designed to perform the functions described herein. A general-purpose processor may be a microprocessor, but alternatively, the processor may be any commercially available processor, controller, microcontroller or state machine. A processor may also be implemented as a combination of computing devices, such as a combination of a DSP and a microprocessor, a plurality of microprocessors, one or more microprocessors cooperating with a DSP core, or any other such configuration. The software can exist in computer-readable tangible storage media in any form. By way of example and not limitation, such computer-readable tangible storage media may include RAM, ROM, EEPROM, CD-ROM or other optical disk storage, magnetic disk storage or other magnetic storage devices, or any other tangible media that can be used to carry or store desired program codes in the form of instructions or data structures and that can be accessed by a computer. As used herein, a disc includes a compact disc (CD), a laser disc, an optical disc, a digital versatile disc (DVD), a floppy disc and a Blu-ray disc.

Various changes, substitutions and alternations to the techniques described herein may be made without departing from the taught techniques defined by the appended claims. In addition, the scope of the claims of the present disclosure is not limited to the specific aspects of the above-mentioned processes, machines, manufactures, composition of events, means, methods and actions. Currently-existing or later-to-be-developed processes, machines, manufactures, compositions of events, means, methods or actions that perform substantially the same functions or achieve substantially the same results as the corresponding aspects described herein may be utilized. Accordingly, the appended claims include such processes, machines, manufactures, compositions of events, means, methods or actions within their scope.

The above description of the disclosed aspects is provided to enable any skilled in the art to make or use the present disclosure. Various modifications to such aspects will be obvious to those skilled in the art, and the general principles defined herein can be applied to other aspects without departing from the scope of the present disclosure. Therefore, the present disclosure is not intended to be limited to the aspects shown herein, but is to be accorded the widest scope consistent with the principles and novel features disclosed herein.

The above description has been presented for purposes of illustration and description. Furthermore, this description is not intended to limit the embodiments of the present disclosure to the forms disclosed herein. Although a plurality of example aspects and embodiments have been discussed above, those skilled in the art will recognize certain variations, modifications, changes, additions and sub-combinations thereof.

What is claimed is:

1. Equipment for filling and bleeding brake fluid, comprising:
  a hydraulic pump, configured to supply brake fluid to a brake fluid reservoir of a vehicle;
  a command sending unit, configured to send a command to a hydraulic brake system of the vehicle for pumping the brake fluid to a bleed screw provided on a brake fluid loop; and a wireless transmitter, configured to send a wireless control signal to an exhaust device connected to the bleed screw for actuating tightening or loosening of the bleed screw.

2. The equipment according to claim 1, wherein the hydraulic pump is configured to pressurize the brake fluid and then inject it into the brake fluid reservoir through a fluid pipe.

3. The equipment according to claim 1, wherein the command sending unit is configured to send an on-board diagnostic (OBD) command to an electronic control unit of the hydraulic brake system, so that the electronic control unit controls an electronic hydraulic pump of the hydraulic brake system to establish hydraulic pressure in the brake fluid loop.

4. The equipment according to claim 1, wherein the wireless transmitter is configured to transmit the wireless control signal to a wireless receiver of the exhaust device, so that an actuator of the exhaust device transfers a rotation torque to the bleed screw under the control of the received wireless control signal.

5. The equipment according to claim 1, further comprising:
  a controller, configured to control operations of the hydraulic pump, the command sending unit and the wireless transmitter according to a standardized operation sequence.

6. The equipment according to claim 5, wherein:
  the controller is further configured to determine whether the equipment has a permission to fill and bleed the brake fluid of the vehicle, and to control the operations of the hydraulic pump, the command sending unit and the wireless transmitter according to the standardized operation sequence only when the equipment has the permission.

7. The equipment according to claim 5, wherein the standardized operation sequence comprises:
  (A) a hydraulic pump starting operation, for supplying the brake fluid to the brake fluid reservoir;
  (B) a brake fluid pumping operation, for controlling an electronic hydraulic pump and electronic hydraulic valves of the hydraulic brake system to pump the brake fluid to the bleed screw through the brake fluid loop;
  (C) a bleed screw loosening operation, for loosening the bleed screw to exhaust air;
  (D) a bleed screw tightening operation, for tightening the bleed screw after a predetermined time period; and
  (E) a hydraulic pump stopping operation, for stopping the supplying of the brake fluid.

8. The equipment according to claim 7, wherein the standardized operation sequence further comprises:
  (F) an air checking operation, for sending an on-board diagnostic (OBD) command to check whether there is air in the brake fluid loop, and wherein:
  (A)-(E) are repeated if the air checking operation fails.

9. The equipment according to claim 1, wherein the exhaust device includes:
  a hollow shaft, including a shaft main body, a first end and a second end being rigid and opposite to each other, wherein the shaft main body is connected to the first end and the second end and has flexibility, the first end is rotationally and fixedly connected to the bleed screw, the second end can be actuated to transfer a rotation torque to the first end along the shaft main body, thereby actuating the tightening or loosening of the bleed screw; and a liquid pipe, provided in the hollow shaft and including a first end and a second end, wherein the first end of the liquid pipe is hermetically connected to the bleed screw and the second end of the liquid pipe is connected to a liquid container for collecting the brake fluid bled from the bleed screw to the liquid container.

10. The equipment according to claim 9, wherein the exhaust device further includes:

an actuator in transmission connection with the second end of the hollow shaft for actuating the hollow shaft.

11. The equipment according to claim 10, wherein the actuator includes a motor and a decelerator connected to the motor, and the decelerator includes an output shaft fixedly connected to the second end.

12. The equipment according to claim 1, wherein the equipment is included in a system for filling and bleeding brake fluid, the system further comprising:

the exhaust device connected to the bleed screw, the exhaust device including:

a wireless receiver, configured to receive the wireless control signal; and an actuator, configured to transfer a rotation torque to the bleed screw according to the wireless control signal for actuating tightening or loosening of the bleed screw.

13. A method for filling and bleeding brake fluid, comprising:

supplying brake fluid to a brake fluid reservoir of a vehicle;

sending a command to a hydraulic brake system of the vehicle for pumping the brake fluid to a bleed screw provided on a brake fluid loop; and sending a wireless control signal to an exhaust device connected to the bleed screw for actuating tightening or loosening of the bleed screw.

14. The method according to claim 13, further comprising:

controlling the operations of supplying the brake fluid to the brake fluid reservoir, sending the command to the hydraulic brake system and sending the wireless control signal to the exhaust device according to a standardized operation sequence.

15. The method according to claim 14, wherein the standardized operation sequence comprises:

(A) a hydraulic pump starting operation, for supplying the brake fluid to the brake fluid reservoir;

(B) a brake fluid pumping operation, for controlling an electronic hydraulic pump and electronic hydraulic valves of the hydraulic brake system to pump the brake fluid to the bleed screw through the brake fluid loop;

(C) a bleed screw loosening operation, for loosening the bleed screw to exhaust air;

(D) a bleed screw tightening operation, for tightening the bleed screw after a predetermined time period; and (E) a hydraulic pump stopping operation, for stopping the supplying of the brake fluid.

16. The method according to claim 15, wherein the standardized operation sequence further comprises:

(F) an air checking operation, for sending an on-board diagnostic (OBD) command to check whether there is air in the brake fluid loop, and wherein:

(A)-(E) are repeated if the air checking operation fails.

17. A non-transitory computer-readable storage medium storing instructions that cause a processor to perform a method for filling and bleeding brake fluid, the method comprising:

supplying brake fluid to a brake fluid reservoir of a vehicle;

sending a command to a hydraulic brake system of the vehicle for pumping the brake fluid to a bleed screw provided on a brake fluid loop; and sending a wireless control signal to an exhaust device connected to the bleed screw for actuating tightening or loosening of the bleed screw.

18. The non-transitory computer-readable storage medium according to claim 17, the method further comprising:

controlling the operations of supplying the brake fluid to the brake fluid reservoir, sending the command to the hydraulic brake system and sending the wireless control signal to the exhaust device according to a standardized operation sequence.

19. The non-transitory computer-readable storage medium according to claim 18, wherein the standardized operation sequence comprises:

(A) a hydraulic pump starting operation, for supplying the brake fluid to the brake fluid reservoir;

(B) a brake fluid pumping operation, for controlling an electronic hydraulic pump and electronic hydraulic valves of the hydraulic brake system to pump the brake fluid to the bleed screw through the brake fluid loop;

(C) a bleed screw loosening operation, for loosening the bleed screw to exhaust air;

(D) a bleed screw tightening operation, for tightening the bleed screw after a predetermined time period; and (E) a hydraulic pump stopping operation, for stopping the supplying of the brake fluid.

20. The non-transitory computer-readable storage medium according to claim 19, wherein the standardized operation sequence further comprises:

(F) an air checking operation, for sending an on-board diagnostic (OBD) command to check whether there is air in the brake fluid loop, and wherein:

(A)-(E) are repeated if the air checking operation fails.

* * * * *